United States Patent [19]

DeLano

[11] 4,159,092
[45] Jun. 26, 1979

[54] SUPPORT FOR MUSICAL INSTRUMENTS

[75] Inventor: Arthur D. DeLano, Battle Creek, Mich.

[73] Assignee: D & J Products, Battle Creek, Mich.

[21] Appl. No.: 892,277

[22] Filed: Mar. 31, 1978

[51] Int. Cl.² ............................................. A47J 7/00
[52] U.S. Cl. ............................. 248/276; 248/288 B; 248/448; 248/441 B
[58] Field of Search .............. 248/122, 124, 126, 314, 248/441 R, 441 B, 448, 460, 463, 482, 276, 288 A, 288 B

[56] References Cited

U.S. PATENT DOCUMENTS

| 1,399,461 | 12/1921 | Childs | 248/482 |
|---|---|---|---|
| 1,448,024 | 3/1923 | Brizgis | 248/126 X |
| 1,464,279 | 8/1923 | Hindley | 248/124 |
| 1,653,772 | 12/1927 | Knoche | 248/122 |
| 1,674,305 | 6/1928 | Sedlock et al. | 248/126 X |
| 1,740,814 | 12/1929 | Hunter | 248/448 |
| 2,660,389 | 11/1953 | Lion | 248/124 X |
| 2,861,501 | 11/1958 | Strelakos | 248/482 X |
| 3,114,215 | 12/1963 | Turkin | 248/463 X |
| 3,680,820 | 8/1972 | Gracie | 248/314 |
| 3,737,137 | 6/1973 | Sheehan | 248/441 R |
| 4,037,815 | 7/1977 | DeLano | 248/285 |

FOREIGN PATENT DOCUMENTS

| 479617 | 12/1951 | Canada | 248/125 |
|---|---|---|---|
| 213760 | 6/1941 | Switzerland | 248/126 |

Primary Examiner—William H. Schultz
Attorney, Agent, or Firm—Fisher, Gerhardt & Groh

[57] ABSTRACT

A musical instrument support for holding a stringed instrument in an elevated position having a bracket receiving portion secured to its base to accommodate a mating bracket carried by an adjustable swivel assembly for attachment to a vertical supporting surface or by a prop member that acts in conjunction with the instrument body support for use on a flat supporting surface. The swivel assembly permits universal angular movement of the musical instrument support relative to a wall. A collar is provided to close about and retain the neck of the musical instrument held thereon.

3 Claims, 10 Drawing Figures

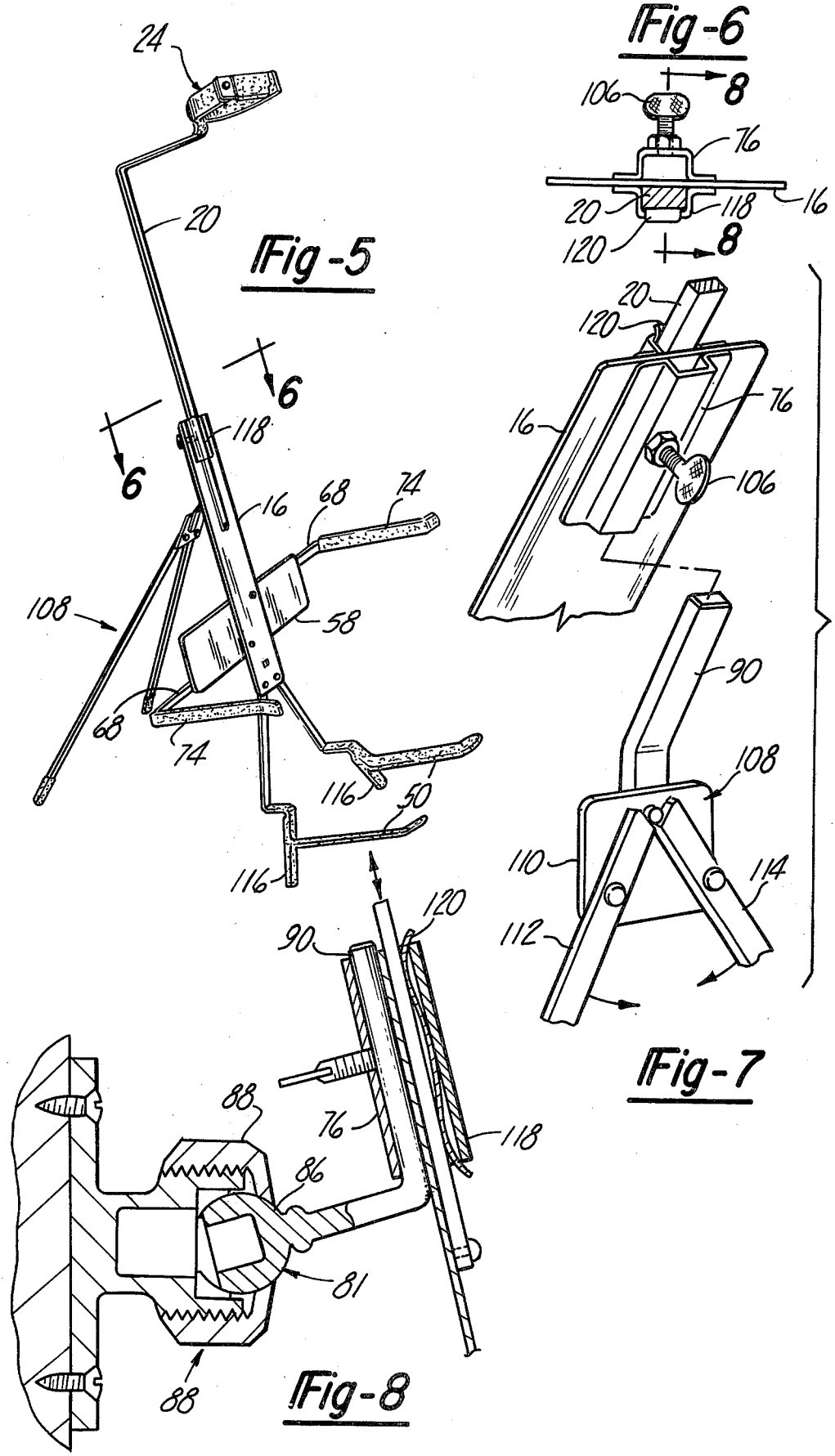

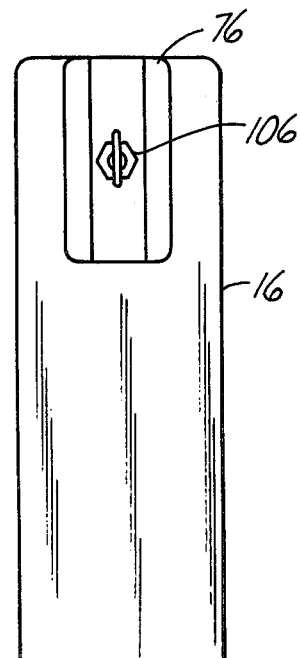
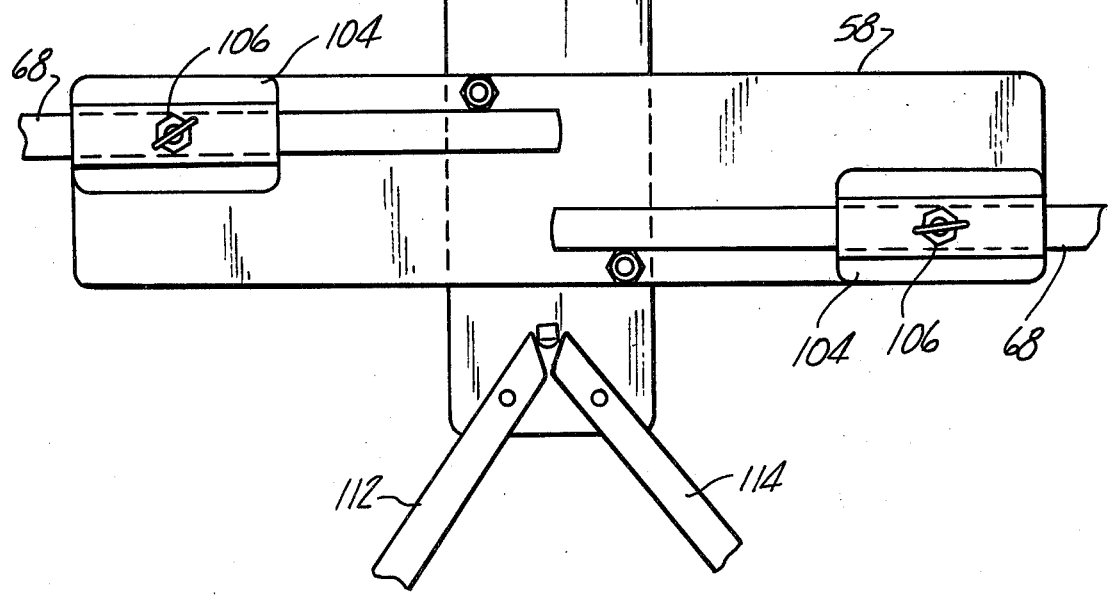
*Fig-9*
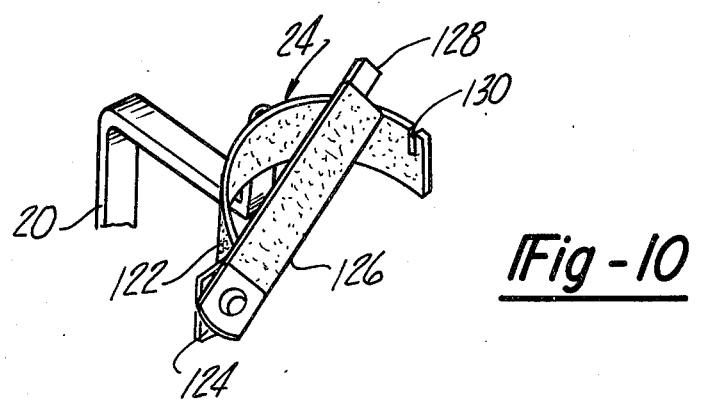
*Fig-10*

SUPPORT FOR MUSICAL INSTRUMENTS

This invention relates to improvements in support devices for musical instruments and particularly to improvements to a support for stringed musical instruments.

In my application Ser. No. 706,999 filed July 19, 1976, now U.S. Pat. No. 4,037,815, I described an instrument support device provided with a bracket by which it may be detachably supported relative to a wall in elevated position above the floor so that the instrument is positioned for ready use or for display purposes.

It has been found desirable to provide a wide degree of flexibility and ease of adjustment in positioning the support device relative to a wall. Use of the support device by different individuals with individual tastes and a wide variety of instruments stored or displayed has necessitated frequent adjustments of the angular relationship.

It has also been found desirable to provide a more secure method of retaining the musical instrument in the support device is positioned in more extreme angles.

It is an object of the invention to provide a stringed instrument support device which may be easily and rapidly positioned relative to a wall.

It is another object of the invention to provide a readily adjustable swivel assembly with which to mount the support device.

It is a further object of the invention to provide a stringed instrument support device with a cushioned collar to securely retain the neck of the instrument.

It is yet another object of the invention to provide a stringed instrument support device with a retaining collar that may be readily opened and closed to allow insertion and removal of the stringed instrument.

A still further object of the invention is to provide a bracket receiving portion on the support device to receive a bracket extending from either the swivel assembly or, when the support device is used on a flat supporting surface, from a prop member.

The stringed instrument supporting device has a base member with extending supports for engaging one end of the body member of the instrument and a member slidably movable relative to the base member to engage the neck of the stringed instrument which is secured by a retaining collar. Oppositely extending arms may be moved to selected positions relative to the base member to engage the sides of the instrument and scales are provided on the arms to facilitate moving the arms equal distances from the base member and to some predetermined position to accommodate a given instrument. A bracket receiving portion is provided on the back surface of the base member for securing the supporting device to a bracket affixed to a mounting member having an adjustable swivel assembly or to a prop member having laterally adjustable legs. The swivel assembly affords universal movement, both rotationally and angularly, in all directions. Alternatively, the swivel assembly may be affixed to the base member and attachable to wall-mounted bracket receptacles. With the neck of the instrument securely enclosed within the retaining collar, a wide range of positioning is made available and accidental dislodgement of the instrument is made minimal.

FIG. 5 is a perspective view of the musical instrument support device in modified form receiving a prop member;

FIG. 6 is a cross-sectional view at an enlarged scale taken along line 6—6 of FIG. 5;

FIG. 7 is a partial assembly view of the prop member and the bracket receiving portion;

FIG. 8 is an alternate embodiment of the wall-mounted swivel assembly of FIG. 4;

FIG. 9 is an enlarged rear view of the base member of the musical instrument support device; and FIG. 10 is an enlarged perspective view of the retaining collar in modified form as shown in FIG. 5.

Figure 2:
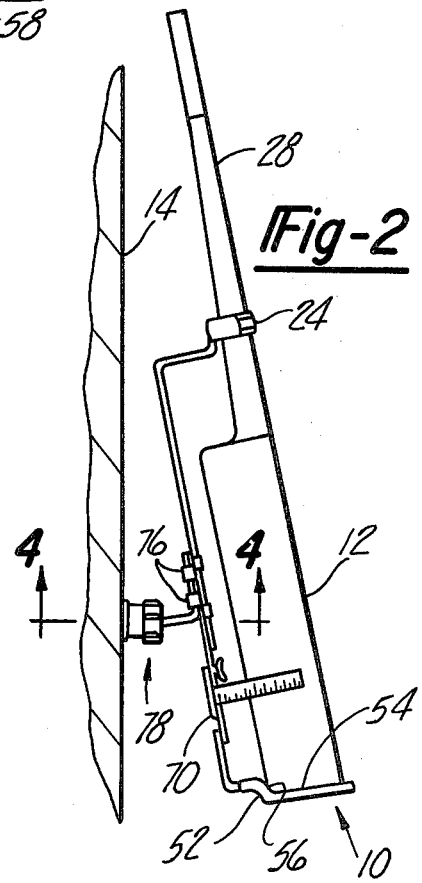
FIG. 2 is a side view at a reduced scale of the musical instrument support device embodying the invention showing a stringed instrument positioned thereon.

Referring to the drawings, the musical instrument support embodying the invention is designated at 10 and is shown in position supporting a musical instrument 12 in the form of a guitar. The support may be attached to a wall 14 for supporting an instrument in a vertical position as seen in FIG. 2 although the support 10 may be positioned horizontally or in other selected positions. As shown in FIG. 5, the device is adapted to receive a prop member 108 which acts in conjunction with an instrument body support 50 for use on a flat surface.

Figure 1:
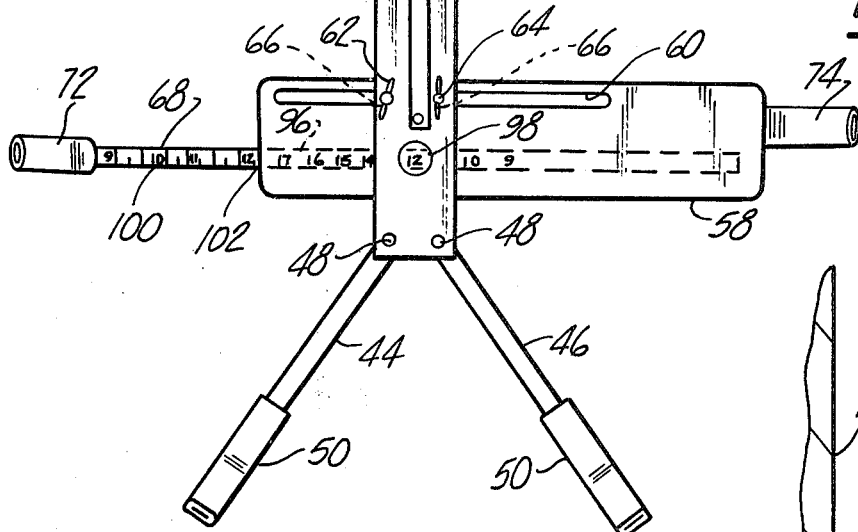
FIG. 1 is a view of the musical instrument support device in its extended position ready to receive an instrument.

Referring now to FIG. 1, the musical instrument support 10 includes a base member 16 which is intended to extend generally longitudinally of the instrument 12 at its back side. The base member 16 supports a neck element 18 which has an elongated bar 20 held for sliding movement by spaced apart guides 22 to the top surface of the base member 16.

Figure 3:
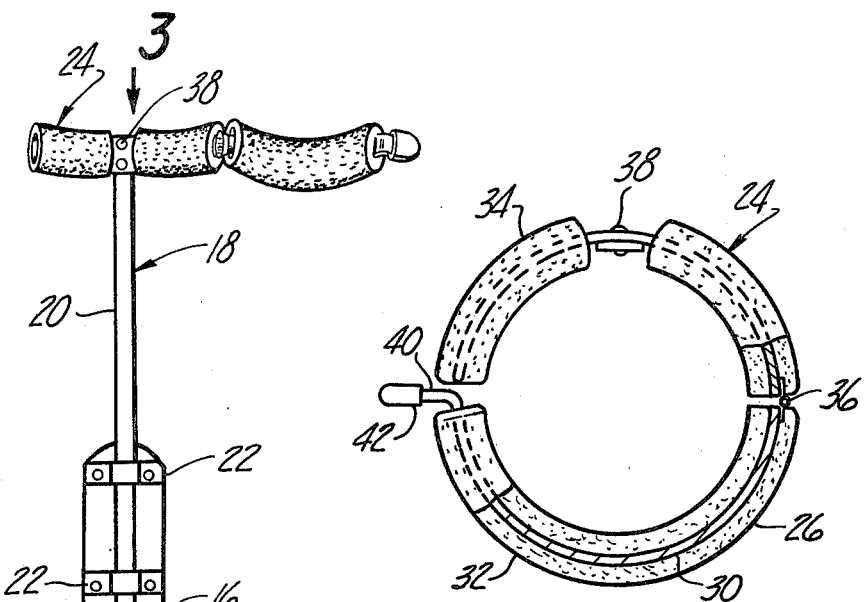
FIG. 3 is a partially cut-away view at an enlarged scale of the retaining collar.

The free end of the bar member 20 is provided with a collar 24 which forms the retaining means by which the fingerboard or neck 28 of the instrument 12 is securely held and which may be covered with a resilient padding material 26 as shown in FIG. 3. The collar 24 includes a structural support 30 of rigid or semirigid material, such as a thin strip of steel, and has an closure member 32 joined to a saddle member 34 by a hinge 36 which allows the member 32 to be swung open to receive the neck 28 of the instrument 12. After the instrument 12 is properly positioned, the upper member 32 of collar 24 is closed, thereby securely retaining the instrument 12 in whatever angle to which the support device 10 is moved. The lower member 34 is fastened to the free end of the bar member 20 by conventional fastening means, such as by rivets 38. A snap-type action may be imparted by using a hinge of the spring-loaded variety. The structural support 30 may terminate in an extended leg member 40 which may be provided with an offset tip 42 to facilitate opening and closing the collar 24.

The end of the base member 16 opposite to the neck element 18 is provided with a pair of legs 44 and 46 which are pivoted at 48 by rivets or the like. The free ends of the leg members 44 and 46 are provided with instrument body supports 50 which may be covered with resilient material such as foam rubber tuning or a vinyl coating. The supports 50 are offset at 52 as seen in FIG. 2 and are adapted to engage the end wall 54 and back 56 of the body portion of the musical instrument 12 when the legs 44 and 46 are positioned as seen in FIG. 2 in their diverging, instrument supporting position. In the storage position, the legs 44 and 46 are parallel to each other and in longitudinal alignment with the base member 16.

The base member 16 supports a transversely extending main arm 58. The main arm 58 has an elongated slot 60 adjacent one marginal edge. The slot 60 receives a pair of bolts 62 and 64 which receive wing nuts 66. Upon loosening of the wing nuts 66, the bolts 62 and 64 slide in the slot 60 during transverse movement of the main arm member 58 relative to the base member 16 and serve to maintain the arm member transverse to the base member. Tightening of the wing nuts 66 on the bolts 62 and 64 serves to maintain the arm member 58 in its selected position of adjustment.

An auxiliary arm member 68 is supported from the main arm member 58 for adjustment longitudinally of the latter and transversely to the base member 16. The auxiliary arm member is mounted at the underside of the main arm member for sliding movement in a socket bracket 70 (FIG. 2) at the underside of the auxiliary arm 58. The socket bracket 70 permits sliding movement relative to the base member 16 and frictionally engages the auxiliary arm 68 so that the latter remains in its selected positions of adjustment. The free end of the auxiliary arm 68 is provided with instrument engaging portion 72 which is similar to the instrument body support portions 50 on the leg members 44 and 46 and is covered with a resilient tubular member or vinyl coating to cushion engagement with the instrument 12. The end of the main arm opposite to the auxiliary arm 68 is provided with instrument engaging portion 74 which is generally similar to the support 72 and is disposed parallel thereto for engaging the opposite side of the instrument 12.

Figure 4:
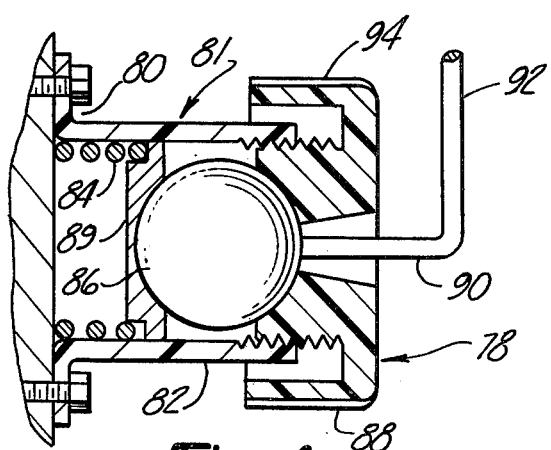
FIG. 4 is a cross-sectional view at an enlarged scale of the wall-mounted swivel assembly.

One or more generally U-shaped bracket receiving portions 76 are rigidly connected to the rear surface of the base member 16 to allow the support device 10 to be secured to a mounting assembly 78. Referring to FIG. 4, the mounting assembly 78 includes a mounting member 80 and a swivel means 81 which includes a housing 82 containing a compressible element 84, such as coiled spring, a ball 86 and a threaded cap 88. If desired, a seating element 89 may be provided between the ball 86 and the spring 84. The base plate 80 is adapted to be affixed to wall 14, or other supporting surface, by means of fasteners or other conventional means. The housing 82 is provided with threads to allow the threaded cap 88 to be adjusted inwardly or outwardly until the desired tension is achieved. In the embodiment of FIG. 4 the compressible element 84 is a coiled spring on which is seated a ball 86. As the cap 88 is tightened, the ball 86 is forced closer to the base of the mounting member 80 thereby increasing the tension on the spring 84. Extending outwardly from the ball 86, through an opening in the cap 88, is a bracket 90 in the form of an L-shaped leg member. The generally vertical leg 92 of the bracket 90 is adapted to slidably engage the bracket receiving portion 76 mounted to the base member 16.

When the threaded cap 88 is loosened, the ball 86 is allowed to swivel freely within the limitations circumscribed by the size of the opening through which the bracket 90 extends. The threaded cap 88 may be provided with finger lugs 94, a knurled surface or other gripping means to facilitate adjustment. Universal movement is thereby afforded which may be rotational in a complete circle or angular in any direction in order to provide a wide variety of display or storage positions. In FIG. 2 is shown the musical instrument 12 stored in a generally vertically position. However, if desired, the instrument 12 may be rotated to a horizontal position or inwardly or outwardly relative to the plane of the supporting surface 14. As an alternative construction, the mounting assembly 78 may be fastened to the base member 16 for engagement with bracket receiving members mounted on a wall.

To adjust the support device 10 in readiness to accept and support the instrument 12, the legs 44 and 46 are disposed in diverging relationship to each other as seen in FIG. 2 and with the instrument placed against the supports 50, the neck element 18 may be extended longitudinally of the base member 16 with the restraining collar 24 in the open position to receive the instrument 12 at a desired location. The collar 24 is then closed about the neck of the instrument holding it securely in position. Thereafter, the main arm 58 and the auxiliary arm 68 are adjusted so that the support portions 72 and 74 engage the sides of the instrument. Adjustments to the mounting assembly 78 may be made with or without the instrument 12 in the support device 10.

Referring to FIG. 1 the main arm 58 is provided with a scale 96 with graduations indicating units of measurement. The numerals identifying the position on the scale are visible through an opening 98 along the central longitudinal axis of the base member 16. As seen in FIG. 1 the numeral 12 appears in the opening indicating that the support 74 is 12 units from the center line of the base member 16. The auxiliary arm 68 also is provided with a linear scale 100 of the same calibration as the scale on the main arm 58. As seen in FIG. 1 when the index reading adjacent the left end 102 of the main arm 58 is the same as the reading in the opening, the support portions 72 and 74 are spaced equal distances from the longitudinal center line of the base member 16. Once the adjustment is made for a particular instrument it simply is necessary to move the main arm member 58 and auxiliary arm member 68 to the reading relating to that instrument to insure that the latter will fit within the supports 72 and 74.

When it is desired to store the instrument support device the entire unit may be folded or collapsed into a compact storage condition. This is accomplished by folding the legs 44 and 46 towards each other so that they are generally parallel and by moving the neck support bracket 18 longitudinally of the base member 16 until the collar 24 is adjacent to one end of the base member 16. Thereafter, one or the other of the bolt 62 and 64 is removed and the main arm member 58 may be pivoted around the remaining bolts 62 or 64 so that the main arm member 58 assumes a side-by-side relationship to the base member 16. The remaining bolt 62 or 64 also permits the main arm member 58 to slide in the slot 60 relative to the base member. The auxiliary arm 68 may be moved longitudinally of the main arm 58 to position the auxiliary arm with the support 72 adjacent to the end of the main arm 58.

Turning now to the alternate embodiment shown in FIG. 5, main arm 58, secured in perpendicular relationship to base member 16, carries a pair of slidably adjustable auxiliary arms 68 provided with instrument engaging portions 74 that are coated with a commercially available vinyl plastic compound to prevent marring of the musical instrument. As shown in FIG. 9, the auxiliary arms 68 are received within horizontal guides 104 that include adjustable fasteners 106, such as thumbscrews, allowing lateral adjustment of the auxiliary arms 68 to the desired position. Near the top of the base member 16 on its rear surface is a bracket receiving portion 76, similarly provided with an adjustable fastener 106 and adapted to slidably receive a bracket 90 extending from either the previously described swivel assembly 81 or from a prop member 108.

The prop member 108 in the preferred embodiment includes a plate 110 to which is pivotably attached a pair of diverging leg members 112 and 114 laterally adjustable relative to each other and a bracket 90 adapted to be slidably received and secured within the bracket receiving portion 76. However, it is contemplated that the prop member may comprise a single leg offset at one end to form a bracket.

If desired, the instrument body supports 50 may include downwardly extending spacing elements 116 to serve as the forward contact points when an instrument is to be supported on a flat surface, such as a floor or shelf. With the prop member 108 forming the rearward contact point, the musical instrument 12 is held in a stable condition, tilted slightly to the rear for display or storage. The spaced elements 116 are especially useful when the bottom extremity of the musical instrument 12 extends below the plane of the instrument body support 50 and may be susceptible to scratching by the underlying support surface.

The spaced apart guides 22 holding the elongated bar 20 of the neck element 18 may also be provided as one continuous mount 118. With reference to FIG. 8, a thin strip of curvilinear spring steel 120 may be secured within the recess of the mount to exert tension against the elongated bar 20 thereby holding it at the desired height without leaving a protruding surface that could damage the back of the musical instrument. Also shown in FIG. 8 is a modified form of mounting assembly 88 in which a compressible element is not used and in which ball 86 extends beyond the outer surface of the threaded cap 88 thereby providing an increased span of possible angular relationship relative to a vertical supporting surface.

Referring now to FIGS. 5 and 10, a modified retaining collar 24 is attached to the free arm of the bar member 20. The inner saddle member 122 has a generally channel-shaped configuration terminating at one end in a straight flange element 124 to which is hingedly secured a closure member 126. The closure member 126 has an extending locking element 128 at the end opposite the hinged portion that is adapted to be received within a latch portion 130 provided in the other end of the inner saddle member 122. A protective covering, such as a plastic vinyl compound, serves to prevent damage to the neck of the musical instrument secured therein.

A musical instrument support has been provided in which an instrument may be supported from a wall in an elevated and adjustable position relative to the floor by means of a collapsible device which folds to a compact storage position and which may be unfolded to support an instrument at several different points. The musical instrument support is unfolded by pivoting legs for engaging the body member of the musical instrument, sliding a collar to a selected position relative to the neck of the instrument, by securing the collar around the neck of the instrument, and the sides of the instrument are engaged by supports which are moved to their proper position with the aid of indicia which indicates when oppositely extending arms have been moved equal distances from the center line of the instrument support device. A diversity of display positions are achieved by rotational and angular adjustment of the swivel assembly and the instrument is held securely in position by the collar. The bracket receptacle on the base member is also adapted to receive a bracket attached to a prop member which functions with the instrument body support to provide a secure supporting device for use on flat surfaces.

The embodiments of the invention in which an exclusive property or privilege is claimed are defined as follows:

1. An adjustable support device for holding stringed instruments having a body portion and a fingerboard extending therefrom, comprising; a base member, a mounting member adapted to be secured to a vertical support surface, swivel means interposed between said mounting member and said base member to afford universal movement between said support surface and said base member, said swivel means being detachably secured to one of said members, a pair of arms extending transversely to opposite sides of said base member and having distal ends adjustable to selected positions to engage the sides of said instrument body member at an intermediate portion thereof for holding said instrument, an instrument body support connected to one end of said base member for engagement with the rear and sides of said body member of the stringed instrument, a neck element supported from the other end of said base member and being movable to selected positions longitudinally of the fingerboard of the instrument, and retaining means secured to one end of said neck element and including cooperating saddle and closure members to resiliently and releasably encircle said fingerboard for holding said instrument in all positions of universal adjustment of the instrument relative to the support.

2. The combination of claim 1 wherein said swivel means is detachably connected to said base member.

3. The combination of claim 2 and further comprising spring means urging said closure element to a closed position.

* * * * *